UNITED STATES PATENT OFFICE.

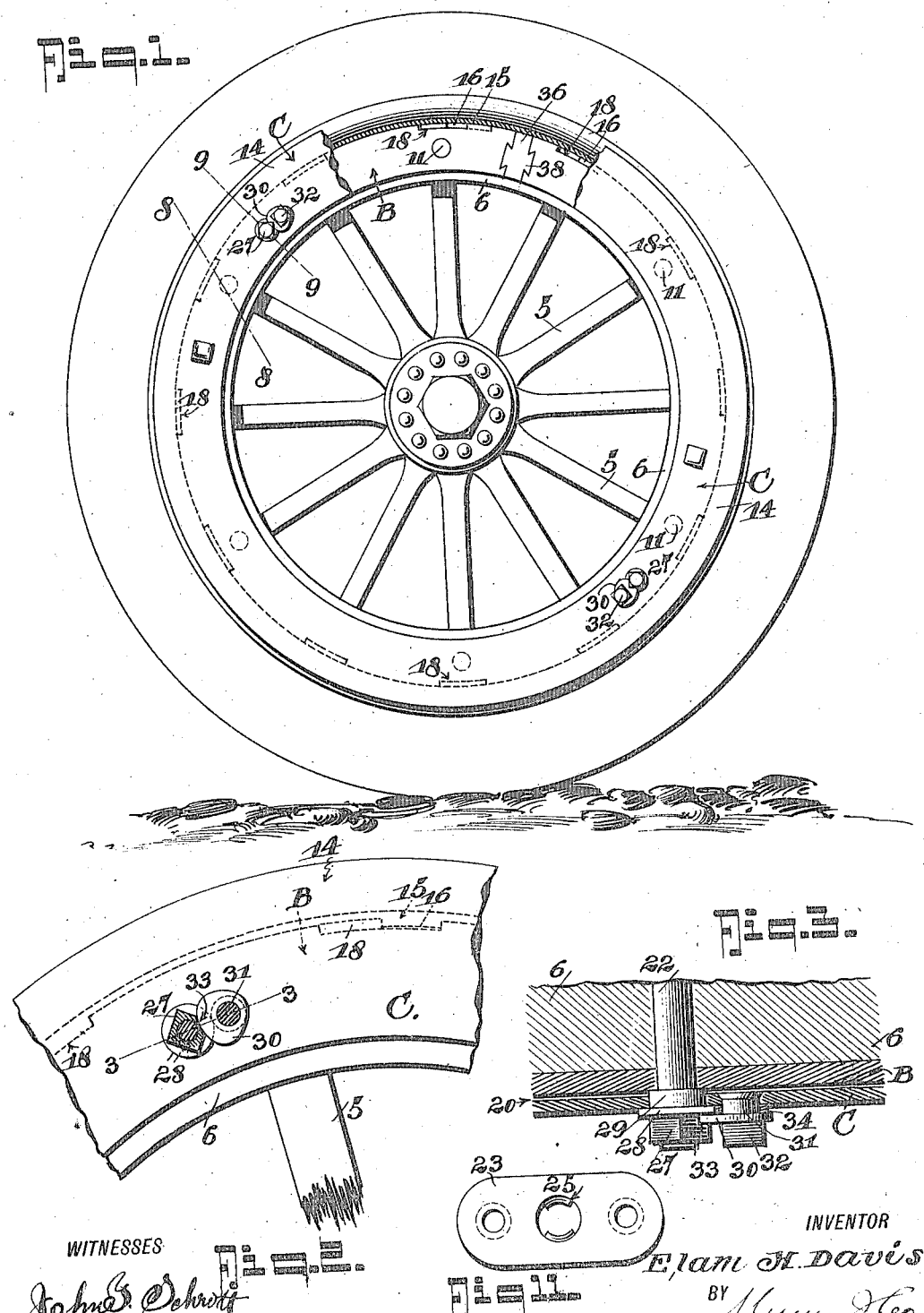

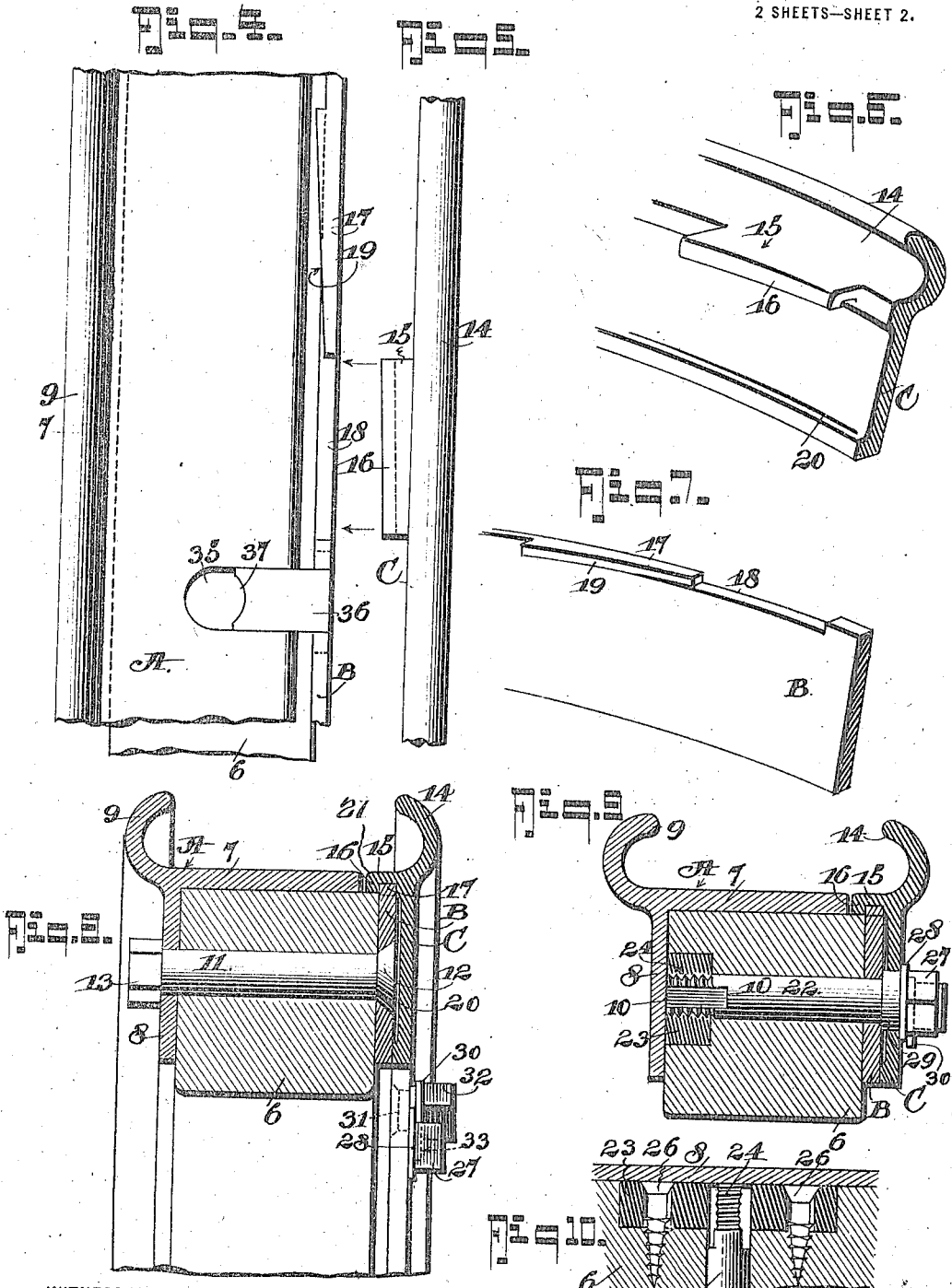

ELAM H. DAVIS, OF MEMPHIS, TENNESSEE.

AUTOMOBILE-WHEEL RIM.

1,265,062.

Specification of Letters Patent.

Patented May 7, 1918.

Application filed June 5, 1916. Serial No. 101,857.

*To all whom it may concern:*

Be it known that I, ELAM H. DAVIS, a citizen of the United States, and a resident of Memphis, in the county of Shelby and State of Tennessee, have invented a certain new and useful Improvement in Automobile-Wheel Rims, of which the following is a specification.

One of the principal objects of my invention is to provide an improved rim for motor vehicle wheels using pneumatic tires, which will, while effectually retaining the tire in place on the wheel, allow of quick and ready dismounting of the tire with minimum effort and without the employment of any special skill or the use of special tools.

Another object of the invention contemplates the provision of a rim consisting of a fixed felly-carried section and a removable section and interlocking means carried by the felly and by the removable section and through the operation of which the removable section may quickly and easily be mounted in place on the felly for coacting with the fixed section in retaining the tire on the wheel, means of novel nature being provided for securing the removable section against accidental displacement.

A further object of my invention is to provide an improved rim of the class described which will be extremely simple, consisting of a minimum number of parts, and which will be durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawing in which like characters of reference indicate like parts throughout the several figures, of which—

Figure 1 represents a view in elevation of a wheel equipped with a rim constructed according to my invention, parts of the rim being broken away to better illustrate the construction of the rim.

Fig. 2 shows a fragmentary view in elevation of a portion of the rim, the retaining bolt and bolt lock being shown partly in section.

Fig. 3 represents a view in section taken on the plane indicated by the line 3—3 of Fig. 2.

Fig. 4 represents a fragmentary plan view of the felly-carried portions of the rim.

Fig. 5 represents a similar view of the removable portion of the rim.

Fig. 6 represents a fragmentary view in perspective of the removable rim portion.

Fig. 7 represents a fragmentary perspective view of the felly-carried annular ring.

Fig. 8 represents a view in section taken on the plane indicated by the line 8—8 of Fig. 1.

Fig. 9 represents a sectional view taken on the plane indicated by the line 9—9 of Fig. 1.

Fig. 10 represents a view in section taken on the plane indicated by the line 10—10 of Fig. 9, and Fig. 11 represents a plan view of the felly-carried plate with which the retaining bolts engage.

Referring more particularly to the drawings, at 5 is indicated generally an automobile wheel of ordinary construction, and at 6 is indicated the felly thereof. On this felly the rim which forms the subject of my invention is mounted.

The rim includes a fixed or stationary section A carried by the felly, an annular ring B carried by the felly, and a detachable annular outer section or removable section C. The section A includes the right angularly disposed annular flanges 7 and 8 which engage and bear against the periphery of the felly, and one side thereof respectively, as clearly indicated in the drawings. Formed integrally with the flanges 7 and 8 is the hook flange 9 for engagement with one of the hook-shaped beads formed at the base of a tire casing.

The annular flat ring B fits against the opposite face of the felly from that against which the flange 8 of section A fits, and the periphery of ring B extends slightly beyond the periphery of the felly. The flange 7 of section A is of a width slightly less than the width of the felly 6, so that a space 10 occurs between the ring B and the adjacent edge of flange 7. The section A and ring B are secured to the felly by a plurality of bolts 11 which extend through the ring B, felly 6, and flange 8 of section A, the heads 12 of the bolts being countersunk in the ring. The outer ends of the bolts which extend through the flange 8 are threaded for receiving nuts 13 whereby the bolts may be tightened in place.

The removable section C is in the nature of an annular ring which, when the section is in place, fits against the ring B. The section C is equipped with a hook flange 14 adapted to engage the bead on the base of the tire casing opposite the one which is engaged by the hook flange 9 of section A. The section C may be stamped out of suitable metal, and this section is provided at spaced intervals along the base of the hooked flange 14 with inwardly extending segments 15 equipped each with a downwardly extending flange or edge 16. These segments may be suitably welded in place upon the removable section C. The segments 15 are adapted to coact with wedges 17 formed on the periphery of the ring B, in securing the removable section C in place upon the felly. The wedges 17 may be formed integrally with ring B or may be welded in place thereon. At the narrower ends of the wedges 17 the peripheral portion of the ring B is recessed as at 18 to allow the introduction of the downturned edges 16 of segment 15 into the space 10 occurring between the ring B and adjacent edge of flange 7. When the section C has thus been placed against the ring B with the downturned edges of the segments occurring in said space 10, a partial twist or turn of the section C in a direction to move the segments toward the wedges, will tighten the section C in place on the felly, since the action of the inclined inner edges 19 of the wedges against the downturned edges of the segments, will draw the section C tightly against the ring B and will effectively wedge it in place. The inner face of the section C is recessed circumferentially as at 20, so that the area of the section which frictionally engages against the ring B is thus greatly diminished. When the removable section is in place as indicated in Fig. 8, the upper faces of the segments 15 are, as will be noted, flush with the outer face of the flange 7 of section A. In order that there will be no danger of the material of the tire casing being cut or caught between the segments and the adjacent edge of flange 7, the corners of said segments and flange are rounded as indicated at 21.

In order that the removable section may be retained in place and held against accidental reverse movement which might tend to loosen it, I provide one or more retaining bolts 22 which are adapted, when the ring has been turned into wedging position, to be passed through registering openings in the section and ring, through a bore provided in the felly 6, and to be turned into engagement with the threaded portions of a bore or opening provided in a plate 23 countersunk in the felly. The inner end of the bolt, as indicated in Figs. 9 and 10, is reduced on opposite sides, the remaining portions of the bolt end being threaded as at 24. The opening in the plate 23 is, as indicated in Fig. 11, provided at diametrically opposed points with instanding threads 25 adapted to be engaged by the threads 24 of the bolt 22, when the latter is moved a quarter revolution. Thus, as will be evident, the bolt may quickly be tightened in place by simply turning it through one quarter of a revolution. The plate 23 may be secured in place by means of screws 26 or other suitable fastening elements, said plate being set in a recess provided in the face of the felly 6 beneath the flange 8. The bolt 22 is equipped, beneath its head 27, with a washer 28 which rests against the outer face of the removable section C, and beneath the washer the bolt is enlarged as at 29, said enlargement presenting a shoulder which may bear against the outer face of the ring B when the bolt is tightened in place.

I have provided a means for securing or locking the bolt 22 in position, and this means is in the nature of a cam or eccentric 30 formed on the rivet 31 carried by the section C adjacent the opening through which the bolt 22 extends, said rivet being provided with a head 32 whereby it may be forcibly turned slightly in one direction or another. The cam, in locking the bolt, is adapted to be turned whereby to engage in a recess at 33 cut in the bolt head 27 just outside of the washer 28, as indicated in Figs. 2 and 3. When the cam has thus been turned so as to engage within the recess in the bolt head, the latter will be prevented from turning in either direction, so that an effective lock for the bolt is thus provided. The rivet 31 is secured tightly in place on the removable section C, so that a considerable force must be applied to the head 32 before the cam may be moved in one direction or another, and therefore there will be no danger of the cam jarring out of engagement with the bolt head 27. A suitable washer indicated at 34 in Fig. 3, may be arranged between the cam 30 and the adjacent face of section C.

As indicated clearly in Fig. 4, the felly 6 and flange 7 of section A are recessed laterally from the outer side of the wheel to the center thereof as indicated at 35, whereby to readily receive the valve of the tire tube. In order that the valve may be retained positively in place after the tire has been placed upon the rim, a filler block 36 is provided, which block is adapted to slide laterally into the recess to fill up that portion thereof not occupied by the valve. The block at its inner end is provided with an arcuate cut-away portion 37 conforming with the curvature of the valve. The ring B is split at a point registering with the recess 35 so as to allow the valve to pass into and out of the recess, and the block is so formed and proportioned as to rest at its outer end flush with the outer face of the ring when said block is in position. In order that the adjacent ends of the ring B may be held against spreading the outer end of the block 36 is equipped with laterally extending dovetailed lugs 38 which fit into dove-tailed recesses provided in the ends of the ring.

The removable section C of the rim may be quickly dismounted by simply unlocking the one or more retaining bolts 22, turning the latter a quarter revolution and withdrawing them, and slightly shifting the movable section in a direction to disengage the wedges and segments, whereupon the removable section may be lifted away from the felly and the tire removed, the filler block being of course slipped out before the tire is drawn off of the rim.

No special skill is required in securing the section in place or in removing the same, so that the rim may be readily operated by amateurs as well as professionals. Furthermore, an exceedingly small space of time is required in mounting or dismounting the removable section, and no special tools are necessary, an ordinary sized wrench being the only tool which is brought into play. When the rim section is in place it is held tightly and solidly onto the felly, and presents such a tight joint that no moisture or foreign matter may enter beneath the inner tube of the tire, so that the latter will be completely protected.

Although I have described the preferred embodiment of my invention, I may desire to make such changes in the construction, combination, and arrangement of parts thereof, as do not depart from the spirit of the invention and the scope of the appended claims.

The removable section of the rim is provided at one or more points on its outer face with lugs or projections 39 which may be tapped by a tool in disengaging the coacting locking means between the section and ring or in finally shifting the outer section into locking position.

I claim:—

1. A wheel rim including a fixed section having a flange extending around the periphery of a felly, said flange being of a width less than the width of the felly, and a hook flange for engaging one of the beads of a tire casing base, an annular ring adapted to be connected to the felly, said ring at its periphery extending slightly beyond the periphery of the felly in spaced relation with the said flange of the fixed section, a removable section in the nature of an annular ring having a hook flange adapted to engage one of the beads of the tire casing base, said removable section being provided at spaced intervals along the base of its hook flange with inwardly extending segments having downturned inner edges, said ring having its periphery at spaced intervals provided with recesses through which the segments may be passed whereby to position the downturned edges of the segments in the space defined between the ring and the adjacent edge of the said fixed section flange, wedges formed on the periphery of the ring at spaced intervals having inclined inner faces against which the downturned edges of the segments are adapted to bear when the said removable section is turned in one direction whereby to wedge said section in place, and means for retaining the said movable sections against accidental reverse movement.

2. In a rim, the combination with a felly of a rim section fixed thereon having a flange extending peripherally around the felly and a hook flange for engaging one of the base beads of a tire casing, an annular ring fixed on one side of the felly extending at its periphery beyond the periphery of the felly in spaced relation to the adjacent edge of the first said flange, means securing the felly, fixed section, and ring together, a plurality of wedges carried at spaced intervals on the periphery of the said ring, said ring at the narrower ends of said wedges being recessed, a removable section adapted to be engaged against the outer face of said ring, said removable section including a hook flange for engaging one of the base beads of a tire casing, a plurality of segments carried by the removable section at spaced intervals, said segments adapted to be engaged with the wedges through the recesses provided in said ring, whereby when the removable section is turned in one direction it will be wedged in place against the said ring, and means for preventing accidental reverse movement of the removable section.

3. In a rim, the combination with a felly, of a fixed rim section secured thereon, an annular ring secured on the felly and extending at its periphery beyond the periphery of said felly, a plurality of spaced wedges provided peripherally of the said ring, a removable rim section in the nature of an annular ring adapted to be engaged against the first said ring, said removable section being provided with a plurality of segments adapted when the said removable section is turned in one direction to engage said wedges whereby to wedge the removable section in place, and means for preventing accidental reverse movement of the said removable section.

4. In a rim, the combination of a felly, a fixed rim section carried on the felly, a removable ring section adapted to be mounted on the felly, and means for preventing accidental detachment of the removable section, said means including a bolt adapted to be extended through registering openings in the removable section and felly, a plate carried by the felly having an opening provided at spaced points with outstanding threads, said bolt being flattened on opposite sides at its inner end and having its remaining portions threaded for engagement with the threads of said plate, and means for locking the bolt against accidental turning movement in either direction.

5. In a rim, the combination with a felly, of a fixed rim section carried thereby, a ring mounted on the felly, a removable rim section engageable against the ring when in mounted position on the felly, and means for preventing accidental displacement of the said removable section, said means including a bolt, having mutilated threads, adapted to be passed through registering openings in the said removable section, ring, and felly, means carried by the felly having mutilated threads with which the bolt threads are adapted to engage whereby the bolt may be tightened, and means for locking the bolt in place.

6 In a rim, the combination with a felly, a fixed rim section carried thereby, a removable rim section adapted to be mounted on the felly, a bolt for securing the removable rim section against displacement from the felly, said bolt provided with a head having a recess cut therein, and a cam riveted on the removable section and adapted to be forcibly turned into the recess in the bolt head for locking said bolt in position.

7. A rim including a felly having a laterally extending recess for receiving the valve of a tire tube, a ring mounted on the felly and having a cut-away portion registering with the recess in the felly, and a filler block slidable into the recessed portion of the felly for retaining the said valve in place, said block being provided with dove-tailed laterally extending lugs adapted to engage within dove-tailed recesses provided in the ring ends for preventing spreading of said ring ends.

ELAM H. DAVIS.